United States Patent [19]

Fujimoto et al.

[11] Patent Number: 5,058,451

[45] Date of Patent: * Oct. 22, 1991

[54] CONTROL LEVER APPARATUS AND ACTUATOR OPERATION APPARATUS

[75] Inventors: Yoshiaki Fujimoto, Himeji; Sachio Hidaka, Kakogawa, both of Japan

[73] Assignee: Kabushiki Kaisha Kobe Seiko Sho, Kobe, Japan

[*] Notice: The portion of the term of this patent subsequent to May 8, 2007 has been disclaimed.

[21] Appl. No.: 433,170

[22] Filed: Nov. 8, 1989

[30] Foreign Application Priority Data

Nov. 11, 1988 [JP] Japan .............................. 63-147955[U]
Nov. 17, 1988 [JP] Japan ................................. 63-290640

[51] Int. Cl.$^5$ ........................ G05G 5/06; G08B 21/00
[52] U.S. Cl. ...................................... 74/527; 340/686
[58] Field of Search ............. 74/527; 340/686, 825.69, 340/825.72, 678, 456, 679

[56] References Cited

U.S. PATENT DOCUMENTS

| | | | |
|---|---|---|---|
| 3,896,280 | 7/1975 | Blake | 340/686 X |
| 3,995,831 | 12/1976 | Spanski et al. | 254/173 R |
| 4,379,281 | 4/1983 | Thomas | 340/686 X |
| 4,529,977 | 7/1985 | Kornus et al. | 340/686 |
| 4,799,048 | 1/1989 | Goshima et al. | 340/686 X |
| 4,922,784 | 5/1990 | Hidaka et al. | 74/527 |

FOREIGN PATENT DOCUMENTS

| | | |
|---|---|---|
| 0051186 | 5/1982 | European Pat. Off. . |
| 3413423 | 10/1985 | Fed. Rep. of Germany ...... 340/686 |
| 55-14199 | 1/1980 | Japan . |
| 61-190621 | 8/1986 | Japan . |
| 2086012 | 5/1982 | United Kingdom . |

Primary Examiner—Vinh T. Luong
Attorney, Agent, or Firm—Oblon, Spivak, McClelland, Maier & Neustadt

[57] ABSTRACT

A switch mechanism 70 discriminate whether a lever 40 is in a detent position or not. When the lever is in the detent position, a detent device 80 is activated by a fluid pressure to produce a force for holding the lever in the detent position. The operation of the detent device is dismissed when the lever is not in the detent position. A pressure sensor 97 detects whether the operator's hand is in touch with the grip 49 of the lever, thus determining whether the operation of the detent device 80 is necessary. An actuator 30 is operated or stopped in response to manipulation of the lever. When the lever is moved to a position other than the detent position, an operation reaction force of a level corresponding to the load pressure in the actuator is applied by reaction force device 60, 60' to the lever so as to enable the operator to sense any change in the load pressure and start of operation of the actuator. When the lever is in the detent position, the reaction force device 60, 60' does not operate so as to enhance the efficiency of the operation of the detent device 80 for holding the lever.

10 Claims, 8 Drawing Sheets

CONTROL LEVER APPARATUS AND ACTUATOR OPERATION APPARATUS

BACKGROUND OF THE INVENTION

1. Field of the Invention

The present invention relates to a control lever apparatus and an actuator operation apparatus which are for use in construction equipment such as a crane. More particularly, the present invention is concerned with a control lever apparatus having a detent device which is capable of holding the lever at a switching operation position and also with an actuator operation apparatus having a reaction force device capable of imparting to the lever an operation reaction force of a level corresponding to the load pressure acting on the actuator.

2. Discussion of the Background

Japanese Utility Model Laid-Open No. 55-14199 discloses an operation apparatus which is provided with a reaction force device which imparts an operation reaction force of a level corresponding to the load on a hydraulic motor of a crane for lifting and lowering a load, in order to enable the operator to sense the movement of the load handled by the crane.

On the other hand, Japanese Utility Model Laid-Open Publication Nos. 61-190620 and 190621 disclose a control lever apparatus having a detent device which is composed of a potentiometer and a torque motor for holding the control lever at a desired operational position.

The operation apparatus disclosed in Japanese Utility Model Laid-Open No. 55-14199 has a pilot lever operated through a lever. The pilot valve produces a pilot pressure of a level corresponding to the operation of the lever, so that a pilot-type control valve is switched by the pilot pressure. As a result of switching of the control valve, a pressurized fluid is supplied to a hydraulic motor for operating a winch so as to actuate the hydraulic motor. The hydraulic motor in turn drives a winch drum connected to the rotor of the hydraulic motor so as to lift or lower a load. Meanwhile, the hydraulic load pressure acting in the motor is introduced to a chamber in a reaction force cylinder, through conduits communicating with ports on both sides of the hydraulic motor and through a pilot conduit. The reaction force cylinder is connected to the pilot valve. The load pressure introduced into the above-mentioned chamber acts to push a piston in the reaction force cylinder and a rod connected to the piston. The rod is brought into contact with a cam connected to the lever so as to produce a force which acts to return the lever to the neutral position, i.e., an operation reaction force. This operation reaction force is proportional to the load pressure acting in the hydraulic motor, so that the operator operating the lever can sense the reactive force proportional to the load pressure in the hydraulic motor. The operator therefore can feel the movement of the load through sensing the change in the load pressure.

In this operation apparatus, however, the lever is returned to the neutral position unless the operator holds it against the reaction force. Therefore, when lifting or lowering of the load is continued for a while, the operator is obliged to hold the lever at an operative position against the reaction force.

On the other hand, the detent device for a control lever, disclosed in Japanese Utility Model Laid-Open Publication Nos. 61-190620 and 61-190621 has a potentiometer connected to a pivot shaft of the lever and a torque motor. The angle of rotation of the pivot shaft, corresponding to the amount of the operation of the control lever, is converted by the potentiometer into an electrical signal. This electrical signal, representing the detected amount of operation of the control leer, is compared with values set in a setting device in which lever detent positions are set. The lever is provided with a detent canceling switch. When the detent canceling switch is off while the lever is in the detent position, a position holding signal is delivered to the torque motor so that the torque motor produces a torque necessary for holding the lever at the detent position. When the lever is set at a position other than detent positions while the detent canceling switch if off, a reaction force signal is delivered to the torque motor so that the torque motor imparts an operation reaction force to the lever. When the detent canceling switch is on, the reaction force signal is generated over the entire range of the lever position so that the torque motor imparts a predetermined level of reaction force to the lever regardless of whether or not the lever is in a detent position.

The detent device of the control lever of the type mentioned above controls the torque motor in accordance with an analog detection signal derived from the potentiometer such that the torque motor controls the force on the lever, i.e., the force for holding the lever at a detent position and the operation reaction force. Thus, the operation reactive fore is controlled in accordance with the angle or amount of operation of the lever, regardless of the load pressure in the actuator. In addition, holding of the lever at a detent position tends to cause hunting of the lever at the detent position due to fluctuation in the response of the torque motor.

SUMMARY OF THE INVENTION

Accordingly, an object of the present invention is to provide a control lever apparatus which can automatically and securely holding a control lever at a detent position.

Another object of the invention is to provide an actuator operation apparatus which, when a control lever of a hydraulic actuator is set at a position other than detent positions, automatically controls the operation reaction force on the controller in accordance with the level of the load on the actuator, i.e., the level of the load pressure, so as to enable an operator to easily sense at his hand any change in the load level and the start of movement of the load without fail.

Still another object of the invention is to provide an apparatus in which, when a lever has been moved to a detent position, operation reaction force is automatically reduced to prevent the lever from moving out of the detent position thus automatically holding the lever in the detent position, while enhancing the response to the switching operation effected at the detent position thereby suppressing the occurrence of hunting.

To this end, according to the invention, there is provided a control lever apparatus comprising: a control lever rotatably supported on a stationary member through a pivot shaft; a rotary member connected to the lever and rotatable as a unit with the lever; a switch mechanism capable of making a selection as to whether the lever is to be held in a detent position; a working fluid source; a detent device acting between the stationary member and the rotary member and capable of operating by pressurized working fluid so as to hold the lever at the detent position; and a control device for supplying, when the switch mechanism has selected to hold the lever in the detent position, the pressurized fluid from the fluid source to the detent device thereby to enable the detent device to hold the lever in the detent position.

In the control lever apparatus of the invention, the rotary member is provided on the surface thereof with a pair of arcuate cam surfaces centered substantially at the axis of the pivot shaft, and the detent device is provided between the stationary member and a detent position on one of the cam surfaces, while the switch mechanism is disposed between the stationary member and the other of the cam surfaces, so that the switch mechanism and the detent device do not interfere with each other.

In the control lever apparatus of the invention, the switch mechanism is provided between the stationary member and the rotary member and is capable of producing a detent position holding signal when the lever is in the detent position and a detent dismissal signal when the lever is in a position other than the detent position.

In the control lever apparatus of the invention, the switch mechanism includes a cam surface provided in the rotary member and a ball which is held in rolling contact with the cam surface. The ball being rotatably carried on an end of a sliding member which is slidably supported by the stationary member and urged by a spring to project towards the cam surface. The ball and the cam surface are made of electrically conductive materials. The cam surface is provided on a detent position with an insulating member so that a switch of the switch mechanism is turned off to enable the switch mechanism to produce the detent position holding signal when the lever has been moved to the detent position, while, when the lever is in a position other than the detent position, the switch is turned on to enable the switch mechanism to produce the detent dismissal signal. When the lever is operated, the ball rolls on the cam surface so as to reduce the resistance force of the switch mechanism against rotation of the lever.

The control lever apparatus of the invention has a detent device which is operated by a pressurized fluid so as to make sure that the lever is held in a detent position. The detent device includes a cylinder case fixed to the stationary member, a detent member slidably supported by the cylinder case, a chamber formed behind the detent member and capable of receiving the pressurized fluid, a spring for urging the detent member to project from the cylinder case, and a detent engaging portion provided on a detent position on the rotary member. An end of the detent member engages with the engaging portion when the lever is in the detent position. The detent member carries at its end ball rotatable thereon and making a rolling contact with the cam surface, while the detent portion of the cam surface is provided with a recess serving as the detent engaging portion.

In the control lever apparatus of the invention, there is provided a control device for controlling operation of the detent device. The control device includes a switching valve switchable in response to a signal from the switch mechanism between a detent operative position where it passes the pressurized fluid from the fluid source to the detent device and a detent dismissal position where it allows the fluid to be discharged from the detent device to a reservoir.

When the lever is in a detent position, the ball engages with the recess mentioned above. On the other hand, the switch mechanism delivers a detent position holding signal and, in response to this signal, the control device allows the pressurized fluid to be supplied to the chamber of the detent device and the pressure of the pressurized fluid produces a force which acts to urge the detent member in the projecting direction, whereby the ball engages with the recess with a large force. Therefore, the lever is securely held in the detent position even when it is released from the operator's hand.

Conversely, when the lever is in a position other than the detent position, the switch mechanism delivers a detent dismissal signal so that the pressurized fluid in the chamber is relieved to a reservoir to reduce the pressure in the chamber. In this state, the ball is held in rolling contact with the cam surface by the force of the spring alone. The ball rolls on the cam surface when the rotary member rotates in response to manipulation of the lever, so that the lever can be manipulated smoothly with reduced resistance.

In the control lever apparatus of the present invention, the switch mechanism for enabling selection whether the lever is to be held on the detent position may include a sensor capable of detecting whether the lever is touched by an operator's hand. The sensor may be a pressure sensor provided on the grip of the lever or a strain gauge capable of detecting deflection of the lever.

In such an arrangement, the detent device never does operate insofar as the lever is touched by the operator. The detent device is allowed to operate to hold the lever in the detent position only when the lever is in a detent position and not touched by the operator.

The actuator operation apparatus of the present invention has a construction which is substantially the same as that of the control lever apparatus. In addition to the feature of the control lever apparatus, the actuator operation apparatus of the invention includes a reaction force device for imparting to the lever an operation reaction force of a level corresponding to the state of operation of the actuator when the lever is in a position other than the detent position.

Namely, the invention also provides an actuator operating apparatus comprising: a control lever rotatably supported on a stationary member through a pivot shaft; a rotary member connected to the lever and rotatable as a unit with the lever; a pilot valve secured to the stationary member and capable of being operated by the rotary member; a pilot-type control valve switchable by pilot pressure output from the pilot valve; a first fluid source; an actuator operable when supplied with a pressurized fluid from the first fluid source while discharging a fluid therefrom, in response to switching operation of the control valve; detection means capable of detecting the state of operation of the actuator; a reaction force device provided between the stationary member and the rotary member and capable of operating by the pressurized fluid so as to produce a reaction force which acts to urge the lever back to a neutral position; a switch mechanism for enabling selection as to whether the lever is to be held in the detent position; a second fluid source; a detent device provided between the stationary member and the rotary member and operative by the pressurized fluid so as to produce a force for holding the lever in a detent position; and a control device capable of controlling, in response to a signal from the switch mechanism, the supply of the pressurized fluid from the second fluid source to the detent device, as well as discharge of the fluid from the detent device, and capable of controlling in response to a signal from the switch mechanism detection means, the supply of the pressurized fluid from the second fluid source to the reaction force device, as well as discharge of the fluid from the reaction force device.

In the actuator operating apparatus of the present invention, the rotary member is provided on the surface thereof with a pair of arcuate cams centered substantially at the axis of the pivot shaft and a reaction force receiving portion orthogonally intersecting the cam surfaces, the switch mechanism being provided between the stationary member and one of the cam surfaces, the detent device being provided between the stationary member and a detent position on the other of the cam surfaces, the reaction force device being disposed at a portion of the stationary member confronting the reaction force receiving portion. The construction of the switch device and the detent device are materially the same as those of the switch mechanism and the detent device of the control lever apparatus explained above. In order to impart to the lever an operation reaction force corresponding to the state of operation of the actuator, the actuator operation apparatus of the present invention has a detection device, a control device and a reaction force device having the following features.

The detection device includes sensors connected to conduits leading to an from a pair of ports for supplying the pressurized fluid to the actuator and for discharging the fluid from the actuator.

The control device may include means for supplying the pressurized fluid from the second fluid source to the detent device while allowing the fluid to be discharged from the reaction force device to a reservoir when the detent position holding signal is produced by the switch mechanism, whereas, when the detent position holding signal is not produced, the means allows the fluid to be discharged from the detent device to the reservoir while supplying to the reaction force device with the fluid of a pressure corresponding to the signal from the detection means.

The control device may include a switching valve switchable in response to a signal from the switch mechanism between a detent operative position where it passes the pressurized fluid from the second fluid source to the detent device and a detent dismissal position where it allows the fluid to be discharged from the detent device to a reservoir.

The control device may include a controller capable of receiving a signal from the switch mechanism and a signal from the detection means and producing a control signal corresponding to the received signals, and an electromagnetic proportional reducing valve capable of producing a secondary pressure corresponding to the control signal from the controller and delivering the secondary pressure to the reaction force device.

The reaction force device may include a cylinder connected to the pilot valve and used for controlling the operation reaction force, a piston axially slidably received in the piston, and a rod connected to the piston and arranged to oppose the reaction force receiving surface of the rotary member.

In the actuator operation apparatus of the present invention, when the lever is operated, the rotary member is rotated to operate the pilot valve so that the pilot pressure delivered by the pilot valve switches the control valve, whereby the pressurized fluid is supplied to the actuator from the first fluid source thereby operating the actuator. The actuator is, for example, a hoist hydraulic motor for a crane and has a rotor connected to a winch drum so that the winch drum is driven by the motor to lift and lower a load.

During the operation, if the lever is in a position other than the detent position, the switch mechanism produces a detent dismissal signal so that the detent device does not operate. However, the state of operation of the actuator is detected by the detection device which produced a signal for operation the reaction force device so that an operation reaction force of a level corresponding to the state of operation of the actuator is applied to the lever. The operation reaction force is accurately controlled in this state because the detent device has been dismissed.

When the lever has been moved to a detent position, the switch device produces a detent position holding signal so that the detent device is operated by the fluid pressure to hold the lever in the detent position. If the reaction force device is operative in this state, it is necessary to apply a high fluid pressure to the detent device in order to hold the lever in the detent position overcoming the operation reaction force produced by the reaction force device. According to the invention, however, the reaction force device does not operate when the lever is in the detent position so that the lever can be securely held in the detent position even when the detent mechanism is operated with a low fluid pressure.

The control lever apparatus and the actuator operation apparatus of the present invention offers the following advantages.

The control lever apparatus is capable of automatically and securely holding the lever in the detent position. When the lever is in a position other than the detent position, the detent device does not operate so that the lever can be manipulated without being interfered with by the detent device. When the lever is in the detent position, the detent device operates by the fluid pressure so as to hold the lever with a large force.

In an arrangement in which the switch mechanism for determining whether the lever is to be held in the detent position is constituted by a sensor capable of detecting a touch of operator's hand with the lever, e,g., a pressure sensor or a strain gauge, the detent device never operates insofar as the operator grips the lever. The detent device automatically becomes operative to hold the lever in the detent position when the lever is released from the operator's hand.

In the actuator operation apparatus of the present invention, the operation of an actuator is controlled by switching a control valve by means of a pilot pressure delivered by a pilot valve which is operable through a lever. When the lever is manipulated at a position other than the detent position, an operation reaction force of a level corresponding to the level of the load pressure acting in the actuator is applied to the lever. In this state, the operation reaction force on the lever is controlled without allowing the detent device to operate, so that the operation reaction force can be controlled accurately without being interfered with by the detent device. The operator can feel and realize any change in the load pressure in the actuator and the start of operation of the actuator, through sensing a change in the operation reaction force applied to the lever. When the lever is moved to a detent position, the detent device becomes operative to hold the lever. In this state, the reaction force device does not operate so that the reaction force is automatically reduced to hold the lever in the detent position without allowing the lever to undesirably move from the detent position. By using a combination of a controller, a switching valve and an electromagnetic proportional reducing valve as the control device, it is possible to enhance the speed of response to the switching of the control conducted when the lever is in the detent position.

DESCRIPTION OF THE PREFERRED EMBODIMENTS

Figure 1A:
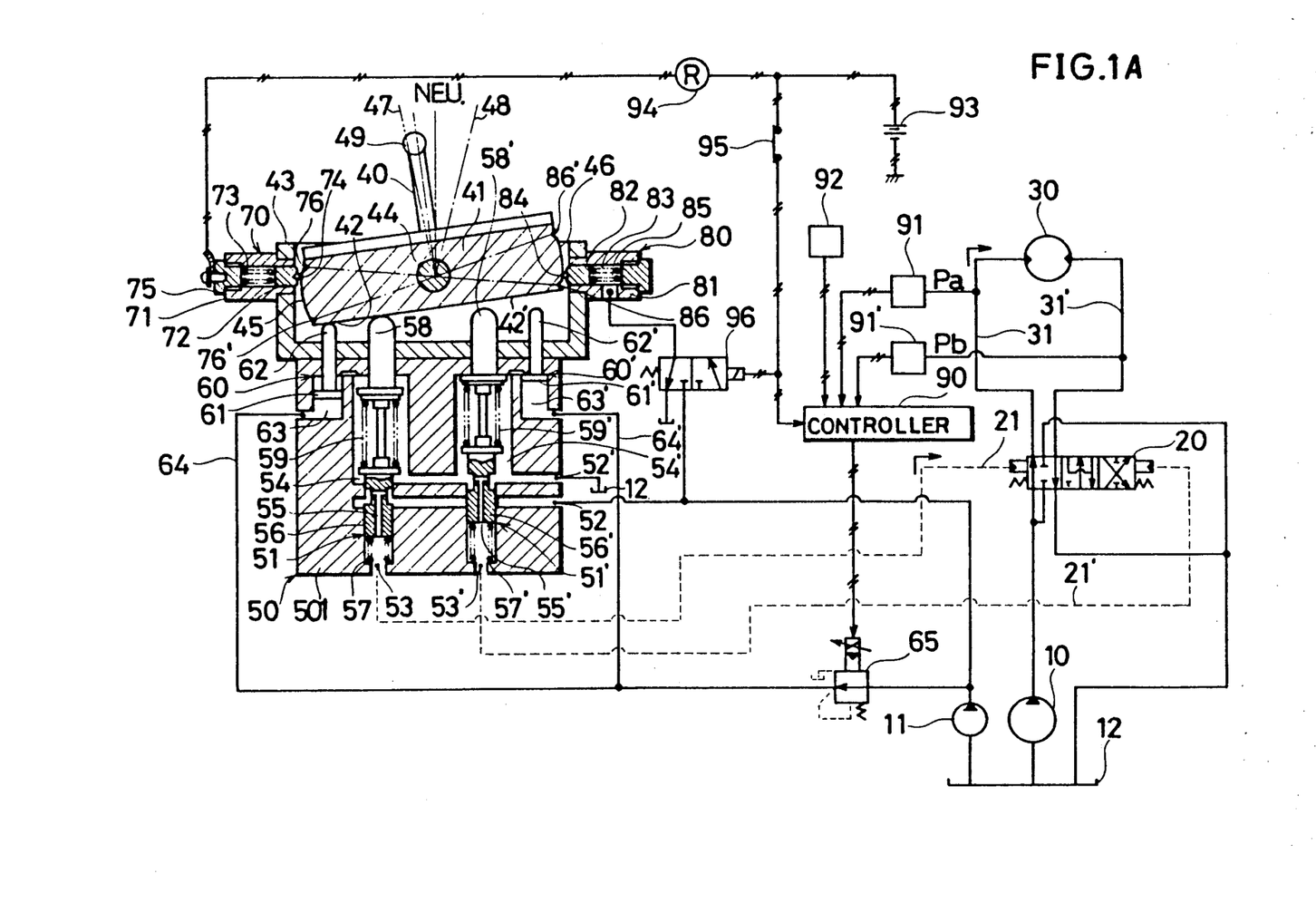
FIGS. 1A, 1B, and 1C are illustrations of an embodiment of a control lever apparatus and an actuator operation apparatus of the present invention in different positions.

FIG. 1A shows a control lever apparatus and an actuator operation apparatus which embody the present invention. The control lever apparatus of the invention has a lever 40, a switch mechanism 70, a detent device 80 and so forth, while the actuator operation apparatus of the invention has a pilot valve 50, a pilot-type control valve 20a, reaction force device 60, 60a', control device for the reaction force device, and so forth.

Referring to FIG. 1A, a main pump 10 serving as a fluid supply source is capable of sucking a fluid from a reservoir 12 and delivering the same to a control valve 20. The control valve 20 is adapted to be switched by a pilot pressure supplied through a pilot valve 50 so as to direct pressurized fluid from the pump 10 to an actuator 30. Fluid discharged from each end of the actuator 30 is returned to the reservoir 12. The actuator 30 is a hydraulic motor and is connected to a winch drum of, for example, a crane. As the motor 30 operates, the winch drum is driven to wind and unwind a cable thereby lifting and lowering a load.

The pilot valve 50 has a valve case 501 which accommodates a pair of reducing valves 51,51' which are used for lifting and lowering the load, respectively. The reducing valves 51,51' have pressure chambers 54,54' corresponding to an input port 52, a return port 52' and output ports 53,53', and spools 56,56' slidably received in these chambers 54,54' and provided with oil ports 55,55'. Springs 57,57' are loaded between the rear ends of the spools 56,56' and the valve case 501. Push rods 58,58' are connected to front ends of the spools 56,56' through springs 59, 59'. A pilot pump 11 as a second fluid supply source is connected to the port 52, while the return port 52' is connected to the reservoir 12. The output ports 53,53' are connected to a switching pilot portion of the control valve 20 through pilot passages 21,21'.

The lever 40 for operating the pilot valve 50 is connected to a rotary member 41 which is pivotally supported through a pivot shaft 44 on a stationary member 43. The stationary member 43 is connected to the valve case 501 of the pilot valve 50. Portions 42,42' formed on the lower surface of the rotary member 41 at both ends thereof oppose the push rods 58,58. of the reducing valves 51,51' so that the push rods 58, 58' of the reducing valves 51,51' are operated by the portions 42,42' when the lever 40 is pivoted about the pivot shaft 44.

The rotary member 41 connected to the lever 40 is provided on both sides thereof with cam surfaces 45,46. One 45 of the cams opposes the aforementioned switch mechanism, while the other cam surface 46 opposes the aforementioned detent device 80.

Figure 1B:
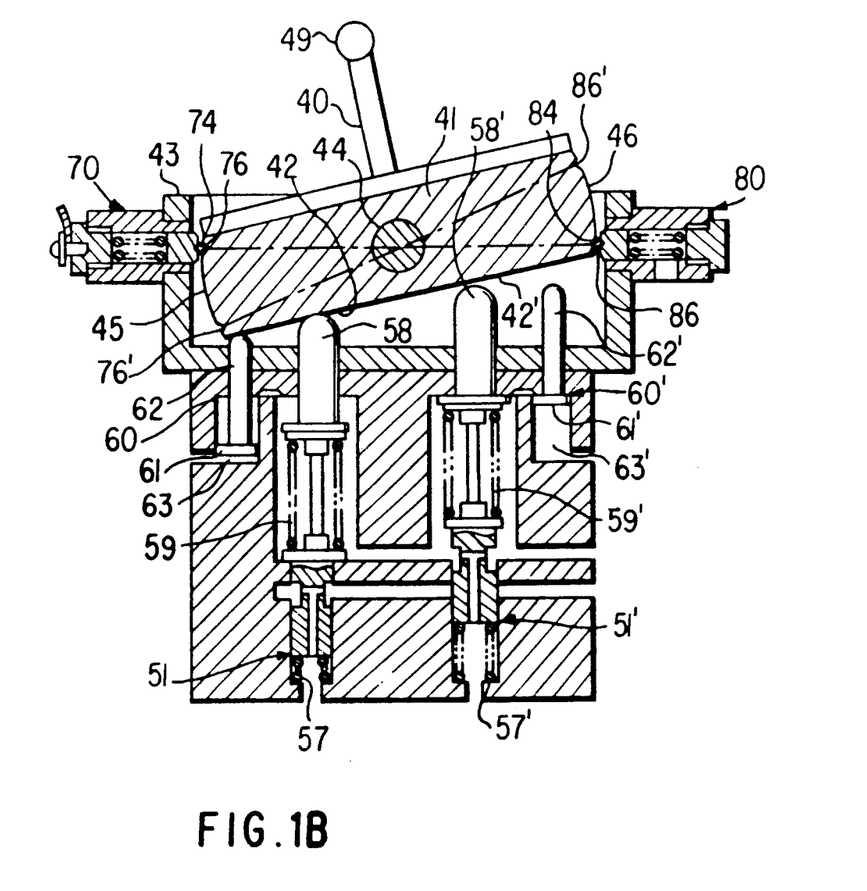
Figure 1C:
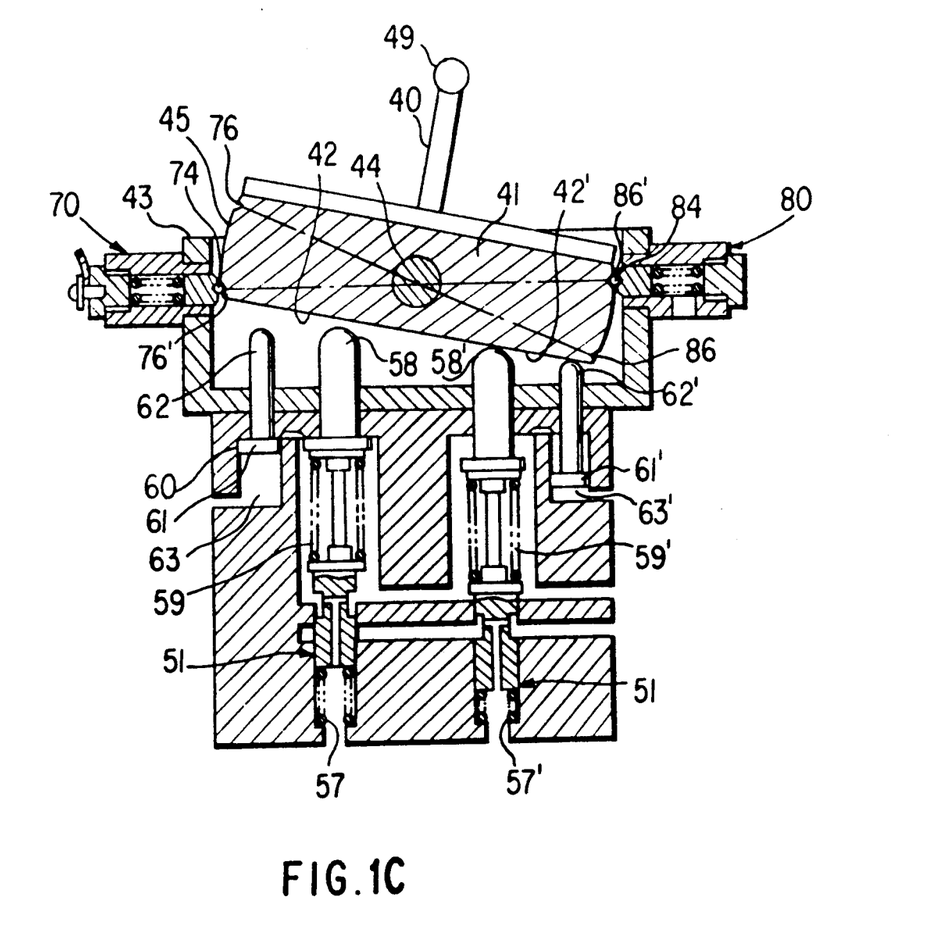

The switch mechanism 70 is capable of detecting whether the lever 40 is in one of detent positions 47, 48 (see FIGS. 1B and 1C, respectively). The switch mechanism 70 is composed of a cylinder case 71 made of an insulating material and fixed to the stationary member 43, a piston 72 as a sliding member received in the cylinder case 71, and a spring 73 for urging the piston 72 towards the cam surface 45. A ball 74 is rotatably held on the end of the piston 72. Thus, the spring 73 urges the piston 72 such that the ball 74 makes rolling contact with the cam surface 45. The ball 74 and the rotary member 41 having the cam surface 45 are made of electrically conductive materials. The ball 74 is electrically connected to a power supply 93 such as battery through a relay 74. The rotary member 41 is electrically grounded through a machine body. Insulating members 76,76' are provided on portions of the cam surface 45 corresponding to the lifting and lowering detent positions.

According to this arrangement, when the lever 40 is in a portion other than the detent positions, the ball 74 contacts the exposed portion of the cam surface 45 so that the ball 74 is electrically connected to the rotary member 41, with the result that the switch is turned on to activate the relay 94. As a result, a normally-closed contact 95 of the relay 94 opens to de-energize a solenoid of a switching valve 96, whereby the switching valve 96 is held at the illustrated position. When the lever 40 is in a detent position, the ball 74 rests on the insulating member 76 or 76' so that the ball 74 and the rotary member 41 are electrically insulated from each other, with the result that the switch is turned off to allow the relay 94 to deenergized. As a result, the normally closed contact 95 closes to allow the solenoid of the switching valve 96 to be energized, whereby the switching valve is moved to the right position as viewed in the drawing.

The detent device 80 has a cylinder-based construction similar to the switch mechanism 70. More specifically, the detent mechanism 80 has a cylinder case 81 connected to a stationary member 43, a piston 82 as a detent member, and a spring 83 which urges the piston 82 towards the cam surface 46. A ball 84 is rotatably carried on the end of the piston 82. Thus, the spring 83 urges the piston 82 so as to keep the ball 84 in rolling contact with the cam surface 46. Recesses 86. 86' as detent engaging portions are provided in the portions of the cam surface 46 corresponding to lifting and lowering detent positions. When the lever 40 is in a detent position, the ball 84 engages with the corresponding recess 86 or 86'. In this state, as a result of the switching of the switching valve 96, pressurized fluid from the pump 11 is introduced into the chamber 85 accommodating the spring 83, whereby the lever 40 is held at a detent position 47 or 48.

The operation apparatus of the present invention is intended for applying to the lever 40 an operation reaction force corresponding to the state of operation of the hydraulic motor 30, and has the following construction. In order to detect the state of operation of the hydraulic motor 30, pressure sensors 91, 91' are connected to the lifting fluid supply conduit 31 and lowering fluid supply conduit 31', respectively, so as to detect the pressures in the respective conditions, i.e., the load pressure in the motor 30.

A controller 90 receives the load pressure in the motor 3 sensed by the pressure sensor 91 or 91', a set value set in a setting device 92 and a signal from the switch mechanism 70, and computes a reaction force control signal in the form of an electrical current which is delivered to an electromagnetic proportional reducing valve 65.

The reaction force devices 60,60' are integrally incorporated in the valve case 501 of the pilot valve 50.

More specifically, the reaction force devices 60, 60' have reaction force cylinder chambers formed in the valve case 501 adjacent to the reducing valves 51,51', pistons 61, 61' slidably received in the cylinder chambers, and rods 62,62' connected to the pistons 61, 61' and opposing the aforementioned portions 42,42' of the rotary member 41. Chambers 63,63' behind the pistons 61, 61' are supplied with a secondary pressure from an electromagnetic proportional reducing valve 65 through conduits 64,64' so that the pistons 61, 61' and, hence, the rods 62,62' are projected outward thereby causing the operation reaction force on the lever 40 to act on the portions 42,42'.

FIG. 14 shows the apparatus in a state in which the lever 40 of the pilot valve 50 has been moved from the neutral position in the lifting direction. As a result of the lifting operation, the portion 42 of the rotary member 41 pushes the push rod 58 of the lifting reducing valve 51 so that the port 53 delivers to the pilot conduit 21 a pilot pressure corresponding to the operation angle of the lever, so that the control valve 20 is switched to the lifting position by the pilot pressure. As a consequence, the fluid discharged from the pump 10 is discharged as indicated by an arrow into the hydraulic motor 30 through the conduit 31 and a counter-balance valve (not shown) provided in this conduit, whereby the hydraulic motor 30 operates forwardly to rotate the winch drum (not shown) in the lifting direction thereby hoisting the load.

During this lifting operation, the pressure Pa in the lifting conduit 31 connected to the hydraulic motor 30 is detected by the pressure sensor 91 and, at the same time, the pressure Pb in the lowering conduit 32 is detected by the pressure sensor 91'. The pressures Pa and Pb are input to the controller 90. When the lever 40 is in a position other than the detent position 47, the ball 74 of the switch mechanism 70 contacts an exposed portion of the cam surface 45 so that the ball 74 and the rotary member 41 are electrically connected to each other, whereby the relay 94 is activated to open its normally closed contact 95, while the solenoid of the switching valve 96 is deenergized to keep the switching valve 96 at the illustrated position. At the same time, the operation signal of the relay 94, i.e., a signal generated by the opening of the contact 95, is input to the controller 90 as a signal indicating that the lever is not in the detent position.

As will be understood from the foregoing description, when the lever 40 is in a position other than the detent positions 47, 48, the controller 90 computes the difference between the pressure levels Pa and Pb derived from the pressure sensors 91 and 91', whereby the lifting load pressure (effective load pressure) is determined. Then, a reaction force control signal corresponding to the lifting load pressure is computed and delivered to the electromagnetic proportional reducing valve 65 so as to control the secondary pressure from this reducing valve 65. The secondary pressure is input to the chamber 63 of the lifting reaction force device 60 so as to cause the rod 62 to project to urge the portion 42 integral with the lever 40 thereby exerting the operation reaction force on the lever 40.

Figure 2:
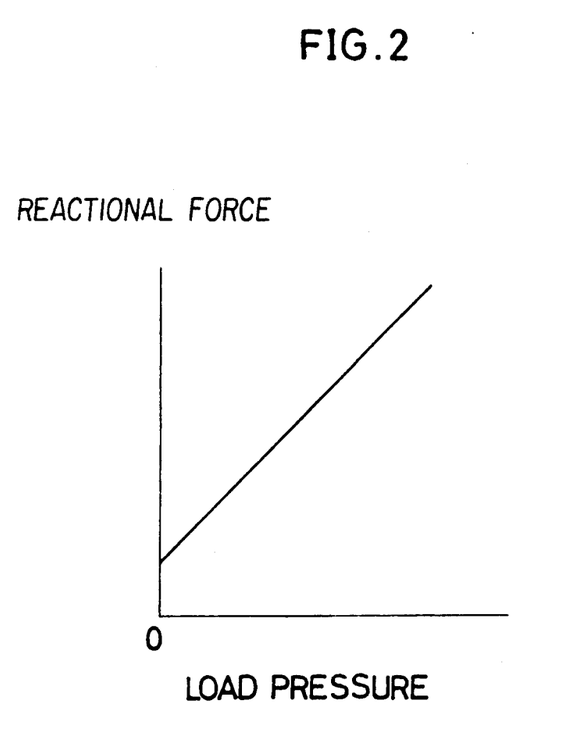
FIG. 2 is a chart showing the relationship between load pressure and operation reaction force under a reaction force control in the operation apparatus of the present invention.

FIG. 2 is a diagram snowing the relationship between the load pressure Pa (Pa—Pb) in the hydraulic motor 30 and the operation reaction force Fa produced by the reaction force device. As will be seen from this Figure, the operation reaction force Fa is controlled in proportion to the load pressure Pa(Pa—Pb) of the hydraulic motor 30, so that the reaction force Fa is small when the load is light and is large when the load is heavy. Thus, the operator can feel and realize the change in the loaded state through sensing the change in the reaction force Fa by his hand gripping the lever 40. When the lever 40 is in a position other than the detent positions 47, 48, the switching valve 96 is in the illustrated position so that the chamber 85 of the detent device 80 is communicated with the reservoir 12 so that only a weak force produced by the spring 83 alone is available as the force for holding the lever 40 in the detent position by the detent device 80. Thus, the reaction force is controlled adequately without being influenced by the holding force produced by the detent device 80.

When the lever 40 is moved to the lifting detent position 47, the ball 74 of the switch mechanism 70 rests on the insulating member 76 so that the ball 74 and the rotary member 41 are electrically insulated from each other with the result that the relay 94 is energized to close its normally-closed contact 95, while the solenoid of the switching valve 96 is energized to shift the switching valve 96 to the right as viewed in the Figure, whereby the close signal of the contact 95 is input to the controller 90 as a detent position detection signal. In this state, the ball 84 of the detent device 80 is located at a position corresponding to the detent engaging portion 86 and, at the same time, the pressurized fluid from the pump 11 is introduced into the chamber 83 of the detent device 80 as a result of the switching of the switching valve 96. As a consequence, the piston 82 is urged outward by the fluid pressure to cause the ball 46 to engage with the engaging portion 86 at a predetermined pressure, whereby the lever 40 is held at the detent position 47 as a result of this engagement.

When the lever 40 is in this detent position 47, the hydraulic motor 30 continues to operate in the winding direction while the control valve 20 is held in the winding position. In addition, the detection signals from the pressure sensors 91, 91' are being received by the controller 90. As a consequence, the reaction force control on the basis of the load pressure is dismissed as a result of the receipt of the detent position signal 47 and a control signal corresponding to a value set in the setting device 92 is delivered from the controller 90 to the electromagnetic proportional reducing valve 65 .

If a control value for nullifying the reaction force is set beforehand in the setting device 92, a signal of zero level is delivered from the controller 90 to the electromagnetic proportional reducing valve 65 when the lever 40 is in the detent position 47, so that the secondary pressure produced by the reducing calve 65 is reduced to zero, thus nullifying the reaction force produced by the reaction force device 60. Therefore, the lever 40 held in the detent position 47 is never forced back to the neutral position but is securely held in the detent position by the above-mentioned detent device 80. Thus, the lever 40 is kept at the detent position so that the lifting operation of the hydraulic motor 3 is continued even after the lever 40 is released from the operator's hand. This enables the operator to operate another level to control another actuator simultaneously. This feature is quite advantageous particularly when operation of two or more actuators is to be controlled and, hence, contributes to improvement in the operation efficiency.

When the lever 40 is in the detent position 47, the difference between the detent holding force produced by the detent device 80 and the reaction force produced by the reaction force device 60 actually serves as an effective holding force. Therefore, the signal delivered to the electromagnetic proportional reducing valve 65, when the lever 40 is in the detent position 47, need not always be zero. Thus, it suffices only to set a minimum reaction force control value in the setting device 92 such that the reaction force produced by the reaction force device 60 in response to the load pressure is smaller than the detent holding force of the lever 40 exerted by the detent device 80.

It is possible to use a variable setting device such as a volume as the setting device 92 so that the set value maybe changed freely depending on the content of the work. Such an arrangement is particularly useful when the crane is designed to have a vibrating function through replacement of an attachment. Namely, in such a case, the minimum reaction force control value set in the setting device 92 is reduced to provide a large effective holding force at the detent position 47 so that the lever 40 can be securely held in the detent position against the vibration generated during operation of the crane in the vibratory mode. On the other hand, when inching operation of the crane is conducted frequently, a greater value may be set in the setting device 92 so that the effective detent holding force at the detent position 47 is reduced so as to enable the operator to move the lever 40 out of the detent position 47 with a small manual force, thus facilitating the inching operation and, hence, remarkably improving the maneuverability.

Figure 3:
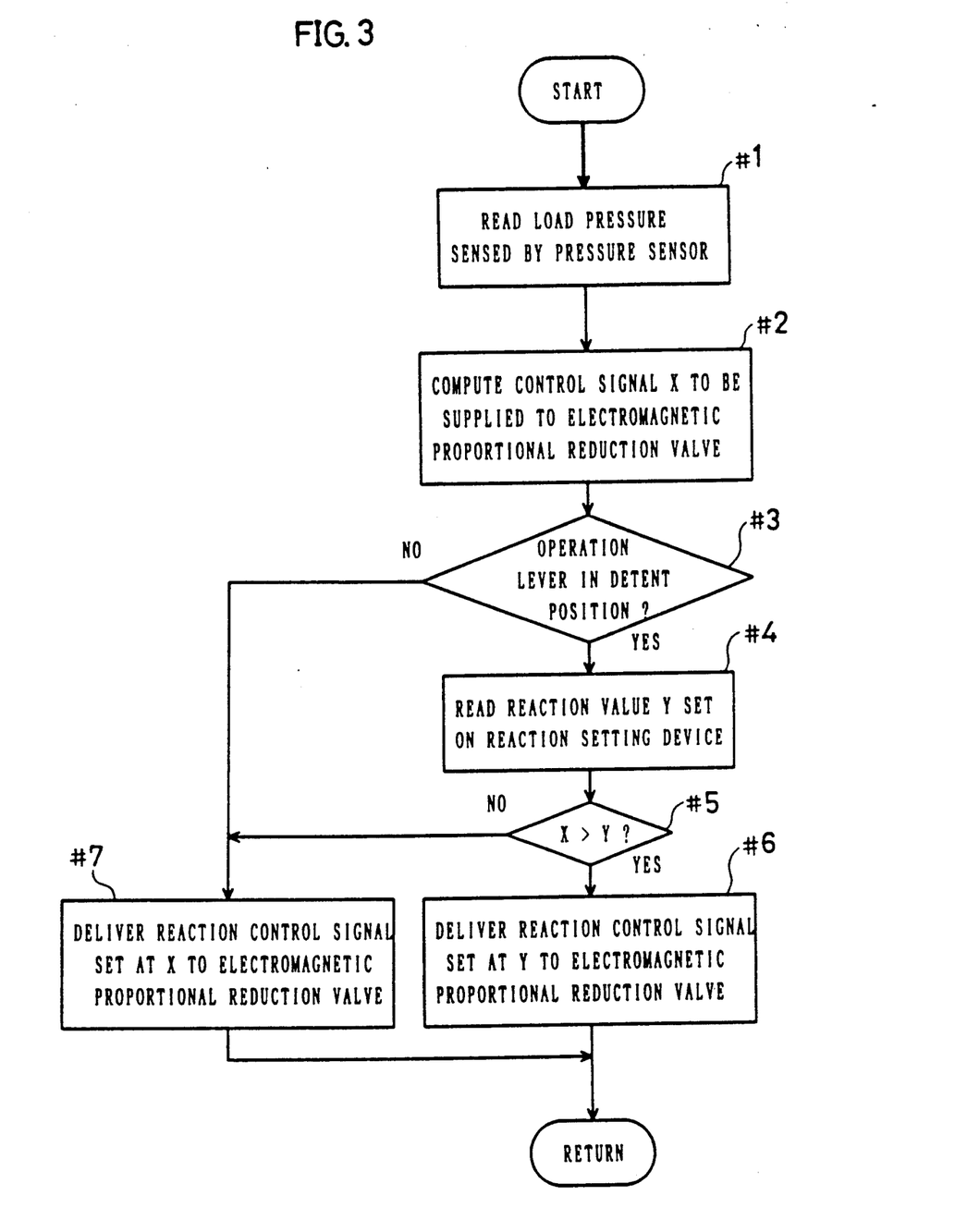
FIG. 3 is a flow chart of a control performed by the operation apparatus of the present invention.

FIG. 3 is a flow chart showing the flow of the control performed by the controller 90 when a variable setting device is used as the setting device 92. Referring to this Figure, in Step #1, the load pressure in the hydraulic motor 30 is determined on the basis of the pressures Pa and Pb sensed by the pressure sensors 91, 91'. In Step #2, the control signal x to be delivered to the electromagnetic proportional reducing valve 65 is computed in proportion to the load pressure. Step #3 determines whether the lever 40 is in a detent position or not. If the answer is YES, i.e., when the lever 40 is in one of the detent positions, the process proceeds to Step #4 in which the reaction force set value y beforehand set in the setting device 92 is read. In Step #5, the control signal x computed in Step #2 is compared with the set value y. When the condition x>y is met, an answer YES is given and the process proceeds to Step #6 in which the reaction force control signal is set to y, i.e., the control value y set in the setting device 92 is delivered to the electromagnetic proportional reducing value 65 as the reaction force control signal. Conversely, if NO is the answer to the question posed in Step #3, i.e., when the lever 40 is in a position other than the detent position, as well as when the answer in Step #5 is NO, i.e., when the condition x>y is not met, the process proceeds to Step #7 in which the signal x computed in Step #2 is delivered to the electromagnetic proportional reducing valve 65 as the reaction force control signal.

Thus, the secondary pressure output from the electromagnetic proportional reducing valve 65 is adequately controlled and is optimumly controlled even when the value set in the setting device 92 is changed, thereby ensuring that the reaction force produced by the reaction force cylinder 6 is maintained below the detent holding force exerted on the lever 40 by the detent device 80. This completely eliminates any risk for the lever 40 being unintentionally returned to the neutral position. Thus, the lever 40 is automatically and securely held in the detent position 47, thus enhancing safety.

A similar control is performed when the lever 40 is moved in the lowering direction to the lowering detent position 48, as well as when the lever 40 is used at a substantial operation reaction force.

Figure 4:
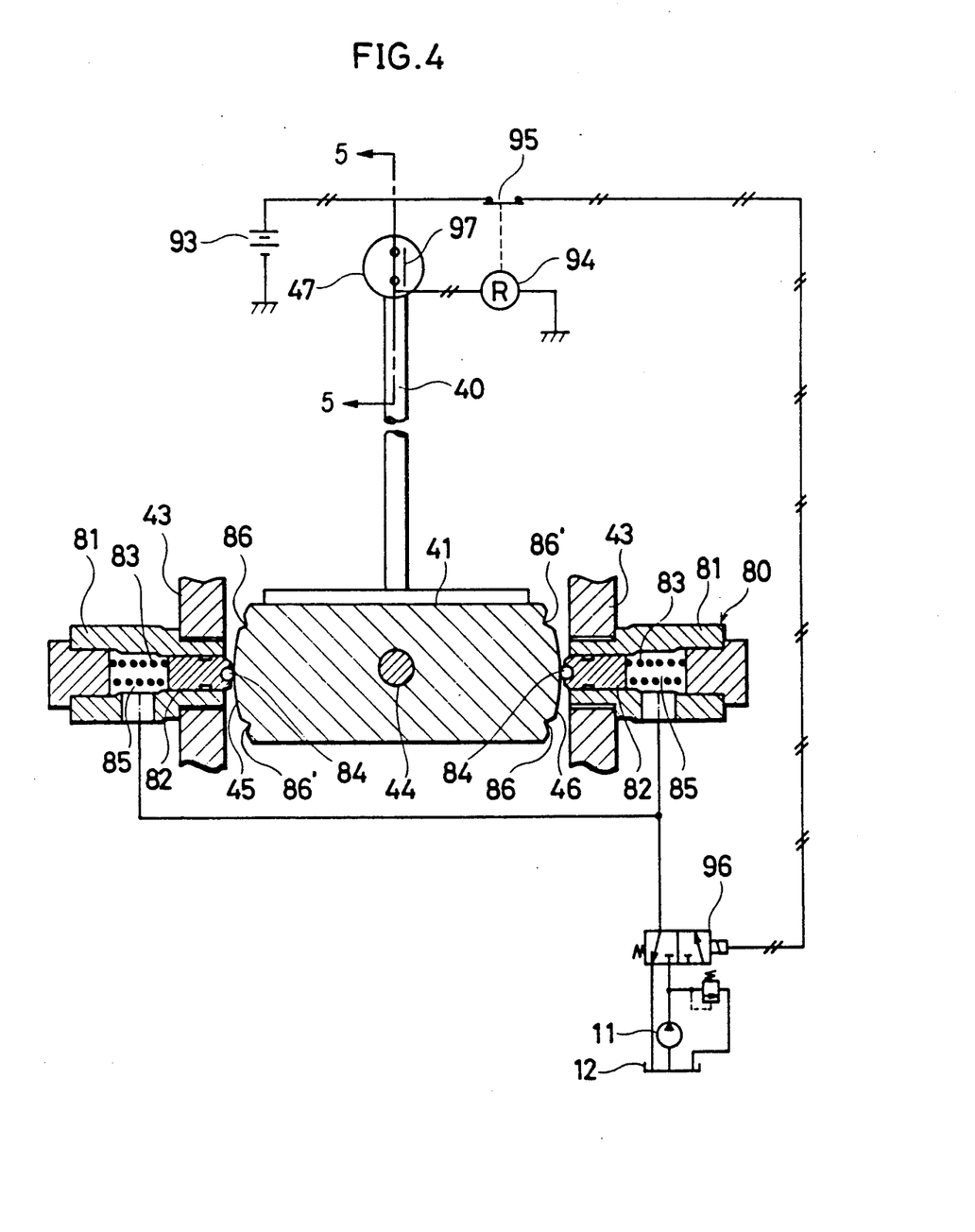
FIG. 4 is an illustration of an embodiment in which a pressure sensor is provided on a lever.

FIG. 4 illustrates an embodiment of the control lever apparatus in which a pressure sensor is provided on the lever. More specifically, this embodiment has a pressure sensor 97 provided on the grip 49 of the lever 40. The pressure sensor 97 is a switch mechanism which allows a selection as to whether the lever 40 is to be retained in the detent position. The pressure sensor 49 is turned on and off, respectively, whenever the grip 49 is touched by and released from the operator's hand regardless of whether the operator wears a glove. The pressure sensor 97 is connected to the power supply 93 in series to the relay 94 which has a normally-closed contact 95 placed in the circuit for the power supply to the solenoid of the switching valve 96. The solenoid is therefore energized and de-energized as the sensor 97 is turned on and off, i.e., as the operator's hand touches and leaves the lever, thus controlling the state of the switching calve 96.

In the embodiment shown in FIG. 1, the switch mechanism 70 is provided to face one 45 of the cam surfaces 45 on the rotary member 41. In the embodiment shown in FIG. 4, however, the switch mechanism 70 facing the cam surface 45 is omitted because in this embodiment the pressure sensor 97 on the lever 40 serves as a switch mechanism. In the embodiment shown in FIG. 4, a detent device 80 similar to the detent device 80 facing the other cam surface 46 is provided so as to face the cam surface 45.

Figure 5:
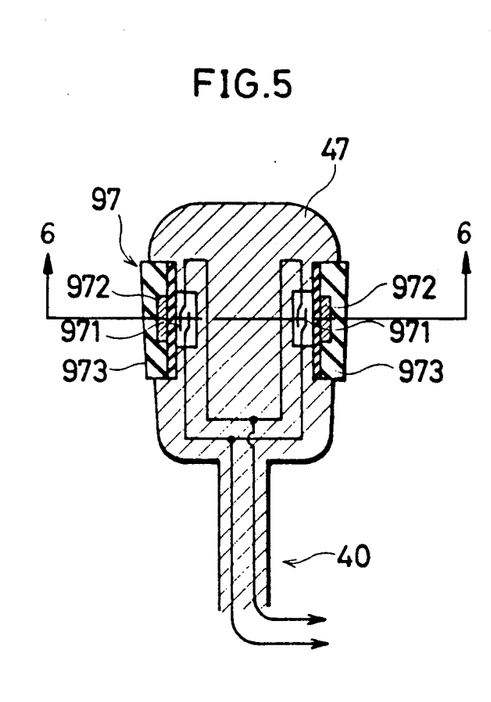
FIG. 5 is a sectional view taken along line 5—5 of FIG. 4 of an example of the pressure sensor.
Figure 6:
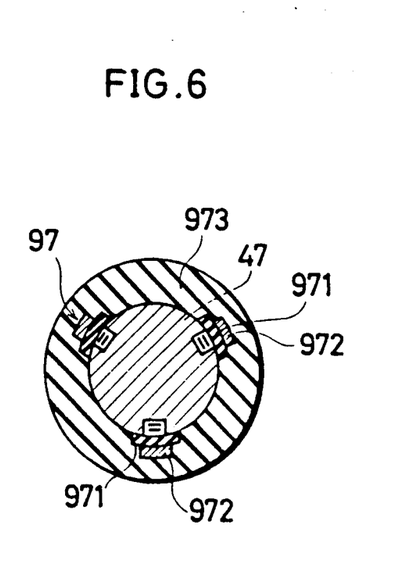
FIG. 6 is sectional view taken along a radial line 6—6 of the lever shown in FIG. 5.

As will be seen from FIGS. 5 and 6, the pressure sensor 97 includes a plurality of lead switches 971 provided on a plurality of portions of the grip 49 of the lever at a circumferential interval, a magnetic member 972 surrounding the switches 871, and a pressure receiving member 973 which surrounds the magnetic member 972. When the operator touches the grip 49, pressure exerted by the operator's hand is received by the pressure receiving member 973 and is transmitted to the magnetic member 873 thereby turning the lead switch 971 on. The above-mentioned force is released when the grip 49 is released from the operator's hand, so that the switch 971 is turned off.

Figure 7:
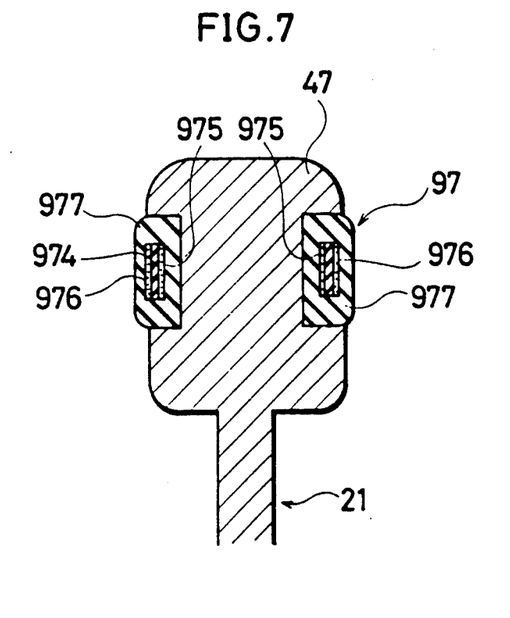
FIG. 7 is a sectional view similar to FIG. 5 but illustrating another example of the pressure sensor.

FIG. 7 illustrates another example of the pressure sensor 97. The pressure sensor 97 shown in FIG. 7 is of a type so-called cord switch. More specifically, this pressure sensor 97 has a switch element 974 made of a conductive rubber the electrical resistivity of which drastically changes between $M\Omega$ and $\Omega$ in response to a pressure applied thereto. The switch element 974 is sandwiched between electrodes 975 and 976 which are made of flat-woven wires. This structure is enveloped by an elastic silicon rubber. Thus, the switch element is turned on and off as the operator touches and releases the grip 49.

The pressure sensor 97 may be provided not only on the peripheral surface of the grip 49 but also on the center or peripheral portion of the top surface of the grip 49.

In the embodiment having the pressure sensor 97, the pressure sensor 97 is turned on or off as the operator grips or touches the grip 49 of the lever 40. As a result, the relay 94 is operated to open its normally-closed contact 95 so that the solenoid is de-energized. As a consequence, the solenoid-actuated switching valve 96 is held at the illustrated position so that the pressurized fluid is introduced into the chamber 85 of the detent device 80. In this state, the detent device 80 exerts only a small force produced by the spring 83, so that the resistance against rotation of the lever 40 can be reduced advantageously.

When the lever has been moved to a detent position where the ball 84 of the detent device 80 engages with the recess 86 to 86', the engagement is sensed by the operator's hand, so that the operator releases the lever 40. As a result, the pressure sensor 97 is turned off to de-energize the relay 94 so as to close the normally-closed contact 95, whereby the solenoid-actuated switching valve 96 is moved to the right position in the drawings. As a consequence, the pressurized fluid from the pump 11 is supplied to the chamber 85 of the detent device 80. In this state, the sum of the force produced by the spring 83 and the force generated by the pressure acting in the chamber 85 is applied to ball 84 so that the rotary member 41 and, hence, the lever 50 are held at the detent position. In this embodiment, a greater retaining force is obtained for retaining the lever 40 at the detent position by virtue of use of the pair of detent devices.

As the operator grips the lever 40 at the grip 49, the retaining force exerted by the detent devices 80 is dismissed without delay so that the ball 84 can easily be separated from the recess 86 or 86' thereby to allow the lever to be manipulated.

Figure 8:
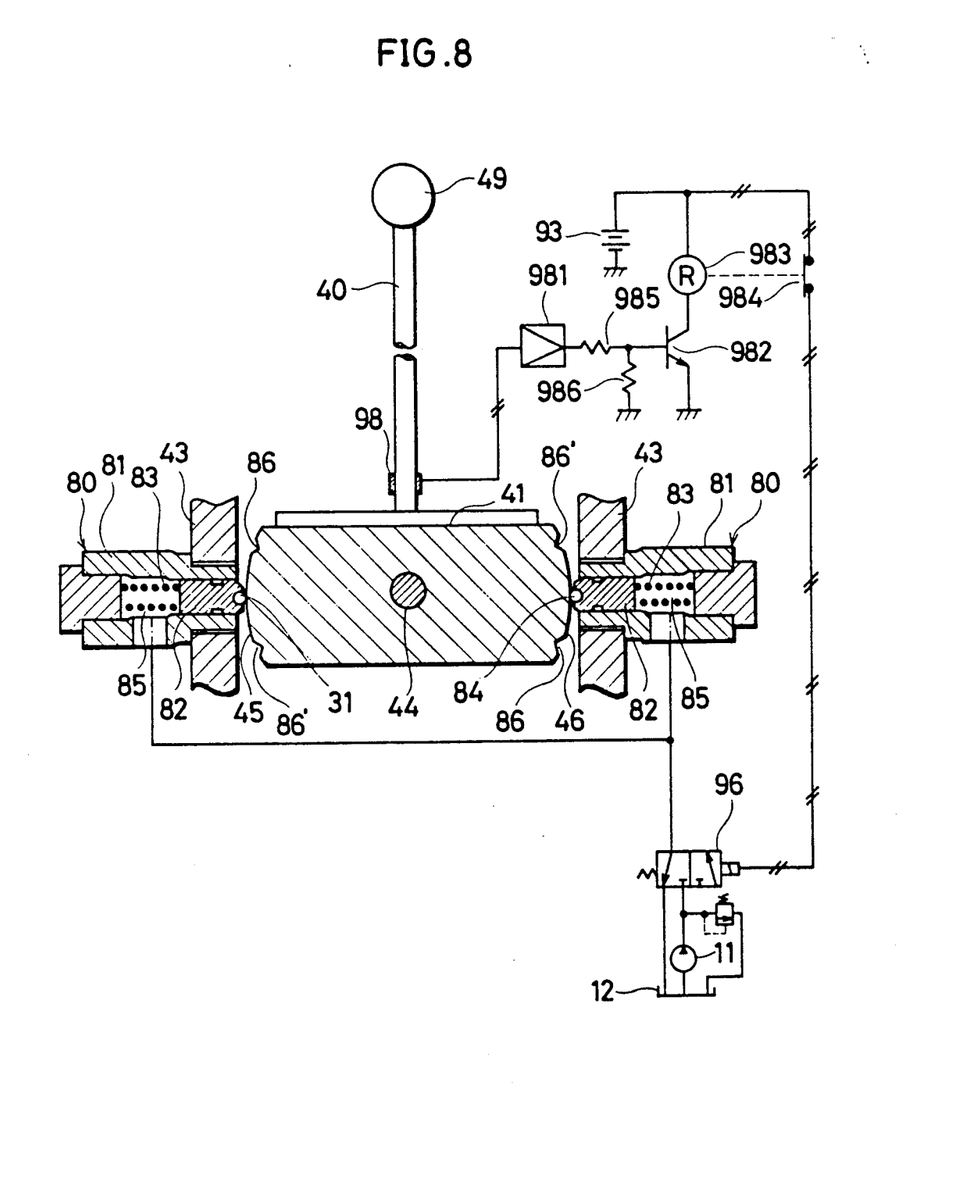
FIG. 8 is an illustration of an embodiment in which a strain gauge is provided on a lever.

FIG. 8 shows an embodiment incorporating a strain gauge provided in the lever. The lever 40 has a certain level of elasticity so that it is deflected or elastically deformed whenever a manipulation force is exerted on the lever, including the state of being merely touched by the hand, regardless of whether the lever 40 is held stationary or moved. In the embodiment shown in FIG. 8, a strain gauge 98 attached to the lever 40 and capable of detecting deflection of the lever 40 is used as the switch mechanism for detecting whether the lever 40 is touched by the user's hand or not.

The output signal from the strain gauge 98 is amplified by the amplifier 981 and, when a predetermined amount of deflection of the lever 40 is detected, a transistor 981 is turned on by the output of the amplifier 981 so as to activate a relay 983. As a consequence, the normally-closed contact 984 is opened to de-energize the solenoid of the electromagnetic switching valve 96. Numerals 985 and 986 denote input resistances of the transistor 982. It will be understood that the arrangement shown in FIG. 8 produces substantially the same effect as the arrangement of FIG. 4.

The control lever apparatus of the present invention can be used for operating an actuator which does not require control of the operation reaction force. Although a hydraulic motor for driving a crane winch has been specifically mentioned as an example of the actuator, the invention can be applied to various other types of actuators such as a hydraulic motor or cylinder for a boom hoist, hydraulic cylinders for driving boom, arm or bucket of a power shovel, and so forth.

The switch mechanism for selecting for conducting selection as to whether the lever is to be held at the detent position may be arranged such that, on the contrary to the case of the embodiment shown in FIG. 1, at least the cam surfaces of the rotary member are electrically insulating and conductive members are provided only on the portions of the cam surfaces corresponding to the detent positions of the lever so that the switch is turned on or off as the ball is moved into and out of contact with the conductive member on the portion of the cam surface corresponding to the detent position.

Although the described embodiments employ two detent devices: one for lifting and one for lowering, this is only illustrative and the invention can have additional detent devices which operate, for example, when the lever is in the neutral position or 1st or 2nd speed positions. Thus, the invention can be carried out with three or more detent mechanisms.

In the described embodiments, the recesses serving as the detent engaging portions are formed in the cam surfaces of the rotary member while balls as cooperating detent members are provided on the pistons. This arrangement may be modified such that balls or spherical projections are provided on the cam surfaces for engagement with recesses formed in the end surface of the piston.

What is claimed is:

1. A control lever apparatus comprising:
    a control lever rotatably supported on a stationary member through a pivot shaft;
    a rotary member connected to said lever and rotatable as a unit with said lever;
    a switch mechanism for making a selection as to whether said lever is being held in a detent position;
    a working fluid source;
    a detent device acting between said stationary member and said rotary member and which is operable by pressurized working fluid so as to hold said lever in said detent position; and
    a control device for supplying, when said switch mechanism has been positioned to hold said lever in said detent position, said pressurized fluid from said fluid source to said detent device thereby to enable said detent device to hold said lever in said detent position.

2. A control lever apparatus according to claim 1, wherein said rotary member includes on a surface thereof a pair of arcuate cam surfaces centered substantially at the axis of said pivot shaft, and said detent device includes a ball provided between said stationary member and said detent position on one of said cam surfaces, while said switch mechanism has a ball disposed between said stationary member and the other of said cam surfaces.

3. A control lever apparatus according to claim 1, wherein the switch mechanism has a ball provided between said stationary member and said rotary member and includes means for producing a detent position holding signal when said lever is in said detent position and a detent dismissal signal when said lever is in a position other than said detent position.

4. A control lever apparatus according to claim 1, wherein said rotary member has an arcuate cam surface centered substantially at the axis of said pivot shaft, and wherein said switch mechanism includes said cam surface and a ball which is held in rolling contact with said cam surface, said ball being rotatably carried on an end of a sliding member which is slidably supported by said stationary member and urged by a spring to project towards said cam surface, wherein said ball and said cam surface comprise electrically conductive members, and said cam surface including an insulating member so that said switch mechanism is turned off to produce said detent position holding signal when said lever has been moved to said detent position, while, when said lever is in a position other than said detent position, said switch is turned on to enable said switch mechanism to produce said detent dismissal signal.

5. A control lever apparatus according to claim 1, wherein said detent device includes a cylinder case fixed to said stationary member, a detent member slidably supported by said cylinder case, a chamber formed behind said detent member and capable of receiving said pressurized fluid, a spring for urging said detent member so as to project from said cylinder case, and a detent engaging portion provided on a detent position on said rotary member, wherein an end of said detent member engages with said engaging portion when said lever is in said detent position.

6. A control lever apparatus according to claim 5, wherein said rotary member is provided on the surface thereof with an arcuate cam surface substantially centered at the axis of said pivot shaft, said detent engaging portion including a recess formed in said cam surface, said detent member rotatably carrying at an end thereof a ball which makes a rolling contact with said cam surface, said ball being engageable with said recess when said lever is in said detent position.

7. A control lever apparatus according to claim 1, wherein said control device includes a switching valve switchable in response to a signal from said switch mechanism between a detent operative position where it passes said pressurized fluid from said fluid source to said detent device and a detent dismissal position where it allows the fluid to be discharged from said detent device to a reservoir.

8. A control lever apparatus according to claim 1, wherein said switch mechanism includes a sensor capable of detecting whether said lever is touched by an operator's hand.

9. A control lever apparatus according to claim 8, wherein said sensor is a pressure sensor provided on the grip of said lever.

10. A control lever apparatus according to claim 8, wherein said sensor includes a strain gauge capable of detecting deflection of said lever.

* * * * *